(12) United States Patent
Ben Dor et al.

(10) Patent No.: US 9,180,383 B2
(45) Date of Patent: Nov. 10, 2015

(54) THROUGHPUT SOLAR STILL

(76) Inventors: Shimon Ben Dor, Kfar-adumim (IL); Ronald Silver, Glancoe, IL (US)

( * ) Notice: Subject to any disclaimer, the term of this patent is extended or adjusted under 35 U.S.C. 154(b) by 731 days.

(21) Appl. No.: 13/525,592

(22) Filed: Jun. 18, 2012

(65) Prior Publication Data

US 2012/0325644 A1   Dec. 27, 2012

(30) Foreign Application Priority Data

Jun. 21, 2011   (IL) .......................................... 213709

(51) Int. Cl.
*B01D 1/00*   (2006.01)
*C02F 1/14*   (2006.01)

(52) U.S. Cl.
CPC ................ *B01D 1/0035* (2013.01); *C02F 1/14* (2013.01); *Y02E 10/42* (2013.01); *Y02E 10/52* (2013.01)

(58) Field of Classification Search
CPC ......... B01D 1/0035; C02F 1/14; Y02E 10/42; Y02E 10/52
USPC ........................................... 203/10; 202/233
See application file for complete search history.

(56) References Cited

U.S. PATENT DOCUMENTS

| 4,252,107 | A  | * | 2/1981  | Horton ......................... 126/605 |
| 4,335,578 | A  | * | 6/1982  | Osborn et al. ............... 60/641.8 |
| 6,336,452 | B1 | * | 1/2002  | Tirey, Jr. ...................... 126/690 |
| 7,173,179 | B2 | * | 2/2007  | Nicoletti et al. .............. 136/246 |
| 7,955,478 | B2 | * | 6/2011  | McClure ......................... 203/10 |
| 8,246,786 | B2 | * | 8/2012  | Cap et al. ......................... 202/82 |
| 8,246,787 | B2 | * | 8/2012  | Cap et al. ......................... 202/82 |
| 2008/0164135 | A1 | * | 7/2008  | Slook .............................. 202/83 |
| 2009/0277224 | A1 | * | 11/2009 | Angel et al. .................... 65/60.1 |
| 2010/0319684 | A1 | * | 12/2010 | Almogy et al. ............... 126/714 |
| 2011/0079269 | A1 | * | 4/2011  | Vander Mey et al. ......... 136/246 |
| 2011/0203915 | A1 | * | 8/2011  | McClure ............................ 203/3 |
| 2011/0247679 | A1 | * | 10/2011 | Shelef et al. .................. 136/246 |
| 2011/0283700 | A1 | * | 11/2011 | Zohar et al. ................. 60/641.15 |
| 2013/0019916 | A1 | * | 1/2013  | Frank et al. ................... 136/206 |
| 2013/0133323 | A1 | * | 5/2013  | Ba-Abbad et al. ......... 60/641.15 |

* cited by examiner

*Primary Examiner* — In Suk Bullock
*Assistant Examiner* — Jonathan Miller
(74) *Attorney, Agent, or Firm* — Blue Filament Law; Guy Levi

(57) ABSTRACT

The disclosure is directed to high efficiency solar still assemblies and their components, and more particularly, to a solar still capable of absorbing direct sunlight and redirected sunlight using a mobile heliostat configured to align the still evaporator, the heliostat and a counter-current heat exchanger with the sun.

16 Claims, 12 Drawing Sheets

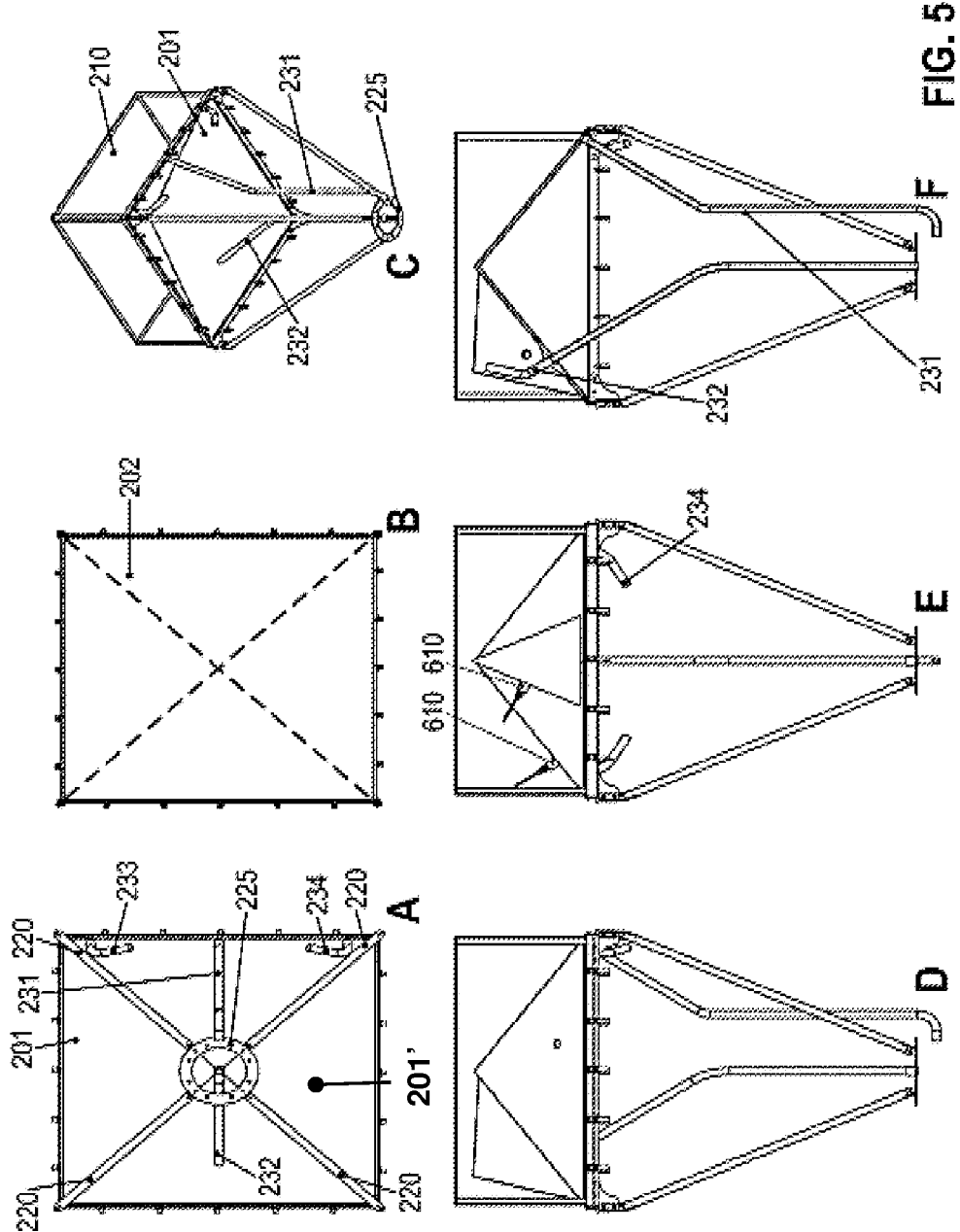

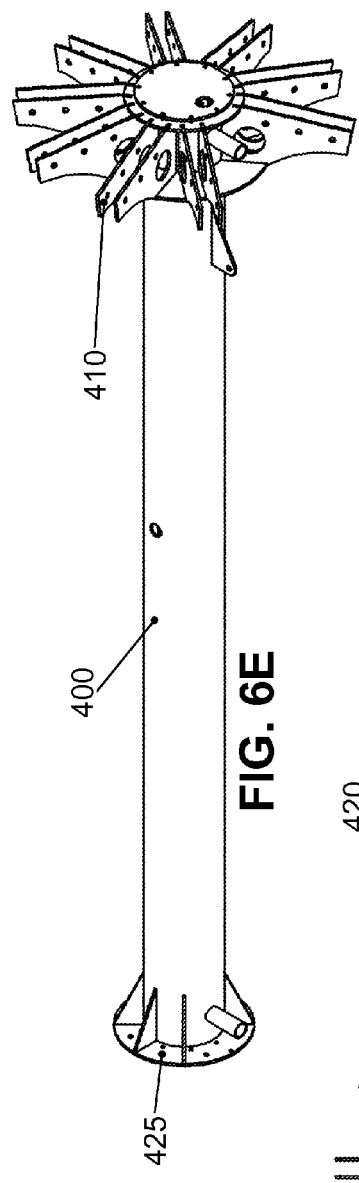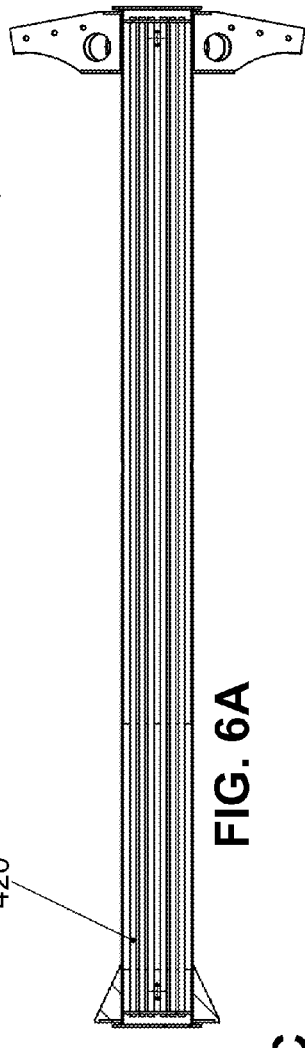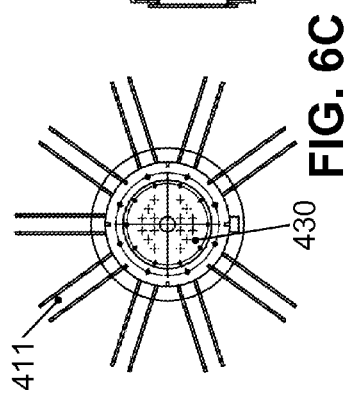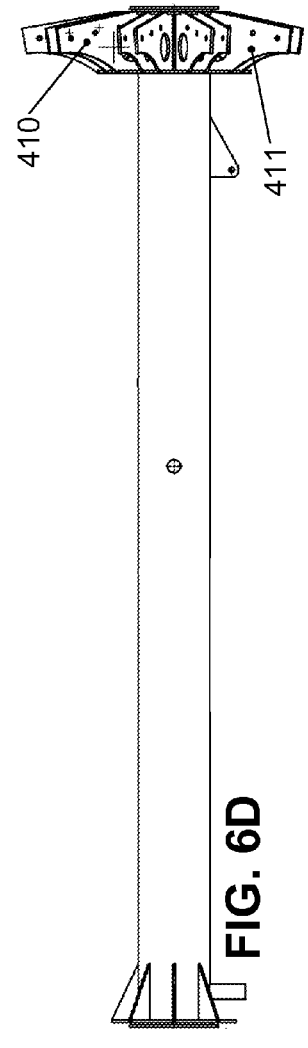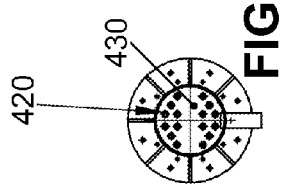

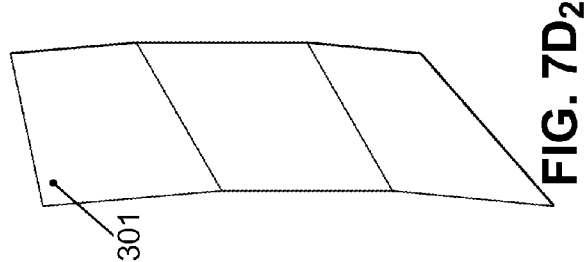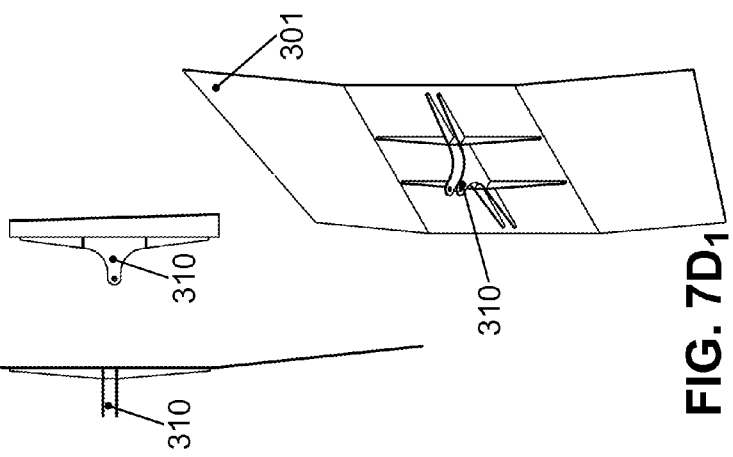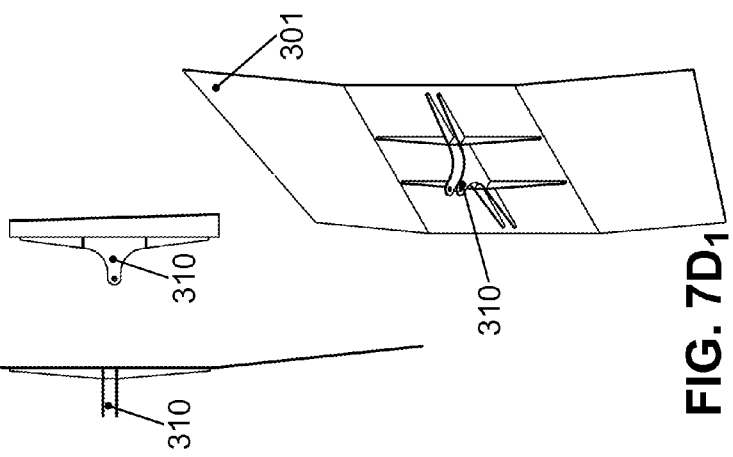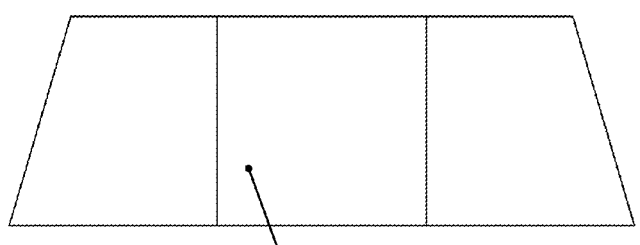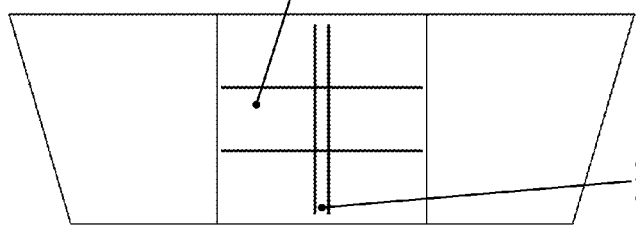

THROUGHPUT SOLAR STILL

FIELD OF THE INVENTION

The present invention relates generally to the field of desalination and purification and more particularly to liquid purification through evaporation and condensation.

BACKGROUND OF THE INVENTION

Embodiments of the present invention generally relate to desalination and purification and more particularly to liquid purification through evaporation and condensation assisted by solar energy.

Desalination systems are systems that remove sugar or other dissolved solids from water, most often to produce potable water. Currently, several methods of desalination are employed by commercial desalination systems, the most popular being reverse osmosis and flash vaporization. Both of these methods are relatively expensive, have large energy requirements and certain components that wear out frequently. For example, reverse osmosis systems force water through membranes and these membranes, which are expensive in and of themselves, could become clogged and torn, thus necessitating frequent replacement. Similarly, flash vaporization systems have corrosion and erosion problems due to the spraying of hot brine within these systems. The energy requirements for a reverse osmosis system may be approximately 6 kWh of electricity per cubic meter, of water, while a flash vaporization system may require as much as 200 kWh per cubic meter of water. Due to the high energy inputs, frequent maintenance, and associated costs desalination of water on a large scale basis has been relatively expensive, often more expensive than finding alternate sources of groundwater. These same factors have made desalination using these methods on a small scale unfeasible.

Solar energy can be harnessed for desalination either directly or indirectly. Collection systems, which use solar energy to produce distillate directly in the solar collector, are called direct collection systems, whereas systems that combine solar energy collection systems with conventional desalination systems are called indirect systems. In indirect systems, solar energy is used to either generate the heat required for desalination or generate electricity subsequently used to provide electric power for conventional desalination plants such as multi-effect, multi-stage flash or reverse osmosis systems as mentioned above.

Direct solar desalination although suited for very small production systems, such as solar stills, suffer from a very low production rate caused by a low operating temperature and near atmospheric pressure of a resulting steam. Solar stills use exactly the same processes, which in nature generate rainfall, namely evaporation and condensation: a transparent cover encloses a pan of saline water that is first evaporated by the trapped solar energy within the enclosure and then condensed on the inner face of the sloping transparent cover. This distilled water is generally potable; the quality of the distillate is very high because all the salts, inorganic and organic components, and microbes are left behind in the bath. One of the problems that negatively influence the still performance is the direct contact between the collector and the saline water, which may lead to corrosion and scaling in the still. The biggest issue for the solar stills however are their rather low efficiency and water production rate: a typical production rate of a solar still is about 4 L/m$^2$/day or less.

Accordingly, a need exists for a desalination and or purification devices that are suitable for a small scale operation that is low cost and reliable.

BRIEF SUMMARY OF THE INVENTION

According to an aspect of the invention, a working liquid purification system is provided, the system comprising: a concave heliostat; a heliostat stand, hingedly connected to a counter-current heat exchanger; a shaped heat exchanger having an upper surface, a lower surface and side walls therebetween, the lower surface configured to allow solar rays redirected from the heliostat to be reflected from a portion of the lower surface hit by the redirected rays to another portion of the lower surface; a counter-current heat exchanger (CCHE) in fluid communication with the shaped heat exchanger, the counter current heat exchanger being substantially cylindrical, disposed between the heliostat and the shaped heat exchanger and configured to provide untreated working liquid to the shaped heat exchanger and collect liquid vapor from the shaped heat exchanger; a pump, the pump being in fluid communication with the counter current heat exchanger; a second heat exchanger, in liquid communication with the counter current heat exchanger; a solar tracker operably connected between the concave heliostat and the heliostat stand, configured to adjust the elevation and direction of the heliostat; and a solar energy converter operably connected to the heliostat, capable of providing electricity to the pump, the second heat exchanger, the solar tracker or any combination thereof.

According to another aspect of the invention, provided herein is a water desalination system comprising: a concave heliostat, the concave heliostat comprised of an assembly of reflective metal surfaces such as polished aluminum, the assembly supported on rods capable of being disassembled; a heliostat stand, hingedly connected to the CCHE; a shaped heat exchanger having an upper surface a lower surface and side walls therebetween, the upper surface comprising a focusing glass and the lower surface having an inverted pyramid shape, configured to allow solar rays redirected from the heliostat to be reflected from a portion of the lower surface hit by the redirected rays to another portion of the lower surface; a counter-current heat exchanger (CCHE) in fluid communication with the shaped heat exchanger, the counter current heat exchanger being substantially cylindrical, disposed between the heliostat and the shaped heat exchanger and configured to provide untreated working liquid to the shaped heat exchanger and collect liquid vapor from the shaped heat exchanger; a pump, the pump being in fluid communication with the counter current heat exchanger; a second heat exchanger, in liquid communication with the counter current heat exchanger; a solar tracker operably connected between the concave heliostat and the heliostat stand, the solar tracker comprised of a solar tracking sensor, a rotational motor, an elevation actuator and a central processing unit capable of receiving a signal from the solar tracking sensor and converting the signal to an output controlling the rotational motor and the elevation actuator, configured to adjust the elevation and direction of the heliostat; and a solar energy converter operably connected to the heliostat, capable of providing electricity to the pump, the second heat exchanger, the solar tracker or any combination thereof.

In yet another embodiment, the invention provides a method of purifying a working liquid, comprising the steps of: providing a system comprising: a concave heliostat; a heliostat stand, hingedly connected to the CCHE; a shaped heat exchanger having an upper surface a lower surface and side walls therebetween, the lower surface configured to allow solar rays redirected from the heliostat to be reflected from a portion of the lower surface hit by the redirected rays to another portion of the lower surface; a counter-current heat exchanger (CCHE) in fluid communication with the shaped heat exchanger, the counter current heat exchanger being substantially cylindrical, disposed between the heliostat and the shaped heat exchanger and configured to provide untreated working liquid to the shaped heat exchanger and collect liquid vapor from the shaped heat exchanger; a pump, the pump being in fluid communication with the counter current heat exchanger; a second heat exchanger, in liquid communication with the counter current heat exchanger; a solar tracker operably connected between the concave heliostat and the heliostat stand, configured to adjust the elevation and direction of the heliostat; and a solar energy converter operably connected to the heliostat, capable of providing electricity to the pump, the second heat exchanger, the solar tracker or any combination thereof; while tracking the sun, pumping a working liquid to the counter current heat exchanger; and collecting the purified liquid.

BRIEF DESCRIPTION OF SEVERAL VIEWS OF THE DRAWINGS

The present invention will be understood and appreciated more fully from the following detailed description, taken in conjunction with the drawings in which:

FIG. 5 illustrates a bottom (A), top (B), bottom right perspective (C) and side views (D-F) of the shaped heat exchanger according to embodiments of the present invention;

FIG. 6a illustrates a cross sectional longitudinal view of a counter current heat exchanger according to embodiments of the present invention. FIG. 6b illustrates a cross sectional view of a counter current heat exchanger at the end attached to the shaped heat exchanger according to an embodiment of the present invention. 6c illustrates a cross sectional view of a counter current heat exchanger at the end attached to the heliostat and second heat exchanger according to an embodiment of the present invention. 6d illustrates a side view of a counter current heat exchanger according to embodiments of the present invention. 6e illustrates a perspective view of a counter current heat exchanger according to embodiments of the present invention;

FIG. 7a illustrates a side view of an element of a heliostat assembly according to an embodiment of the present invention. 7b illustrates a front view of an element of a heliostat assembly according to an embodiment of the present invention. 7(c,d) illustrates a top and bottom view of an element of a heliostat assembly according to an embodiment of the present invention. 7d illustrates a top and bottom perspective view of an element of a heliostat assembly according to an embodiment of the present invention.

Figure 1:
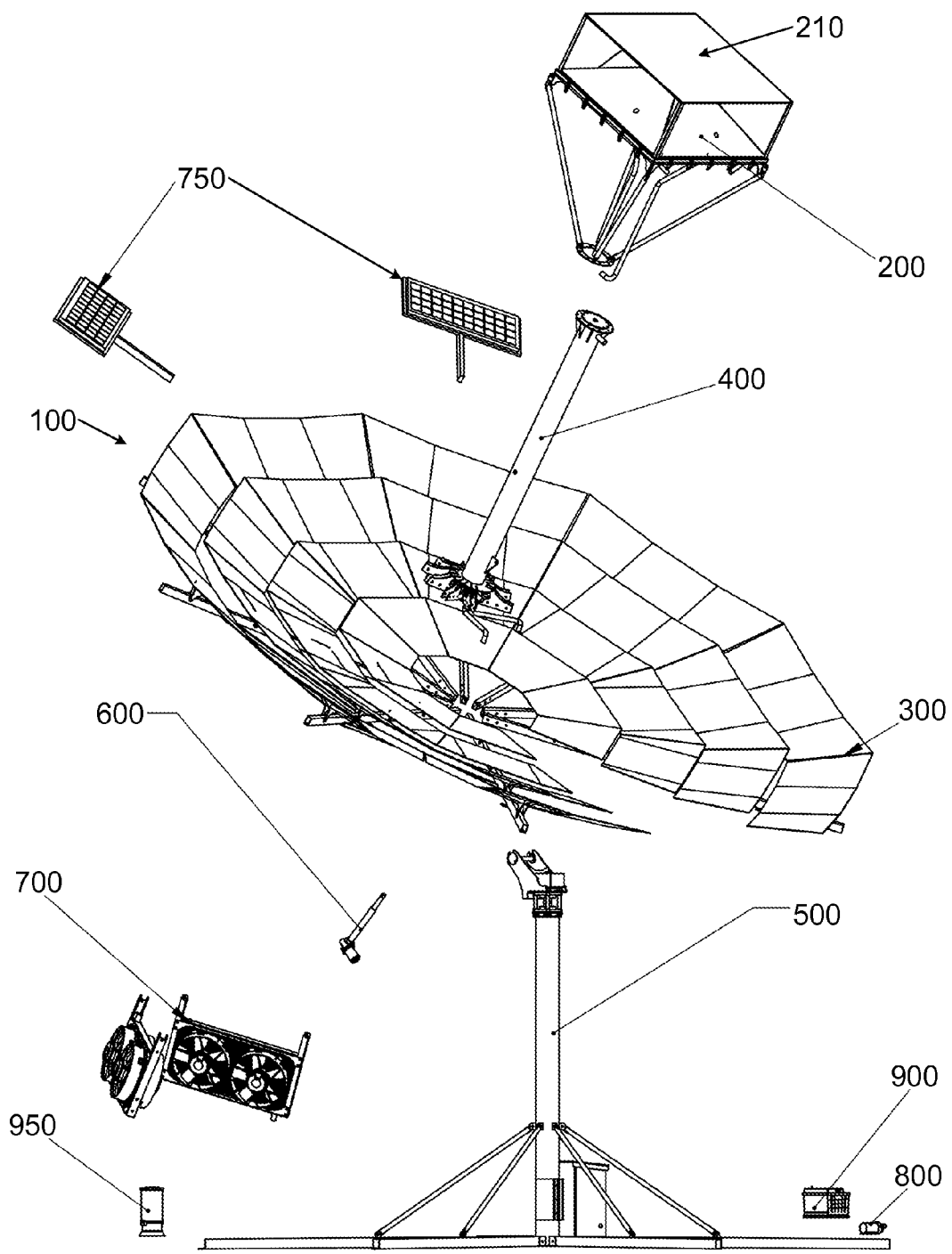
FIG. 1 illustrates an exploded view of a desalination and or purification system of an embodiment of the invention FIG. 2(A-D) illustrates perspective views of a system according to embodiments of the present invention.
Figure 2A:
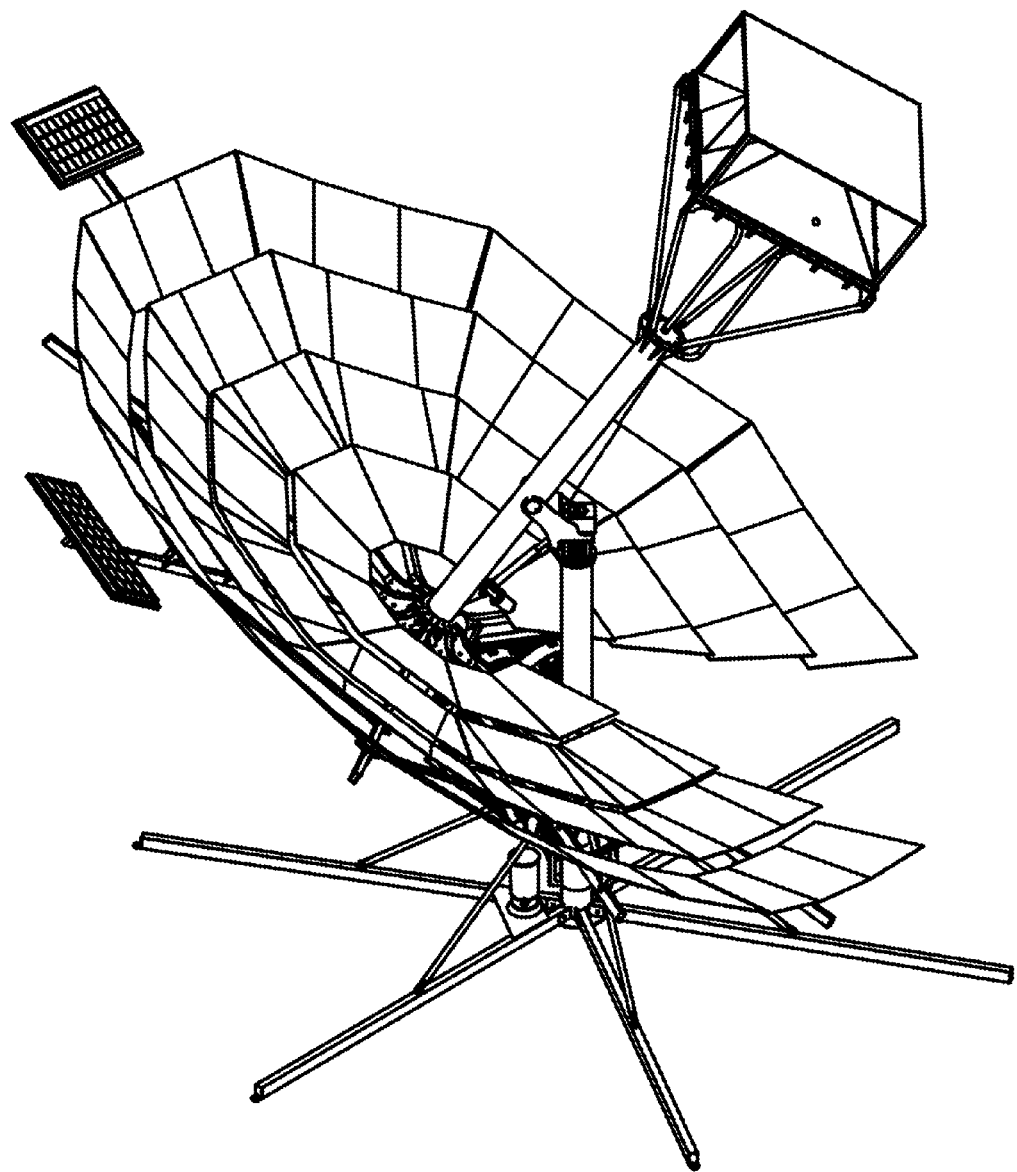
Figure 2B:
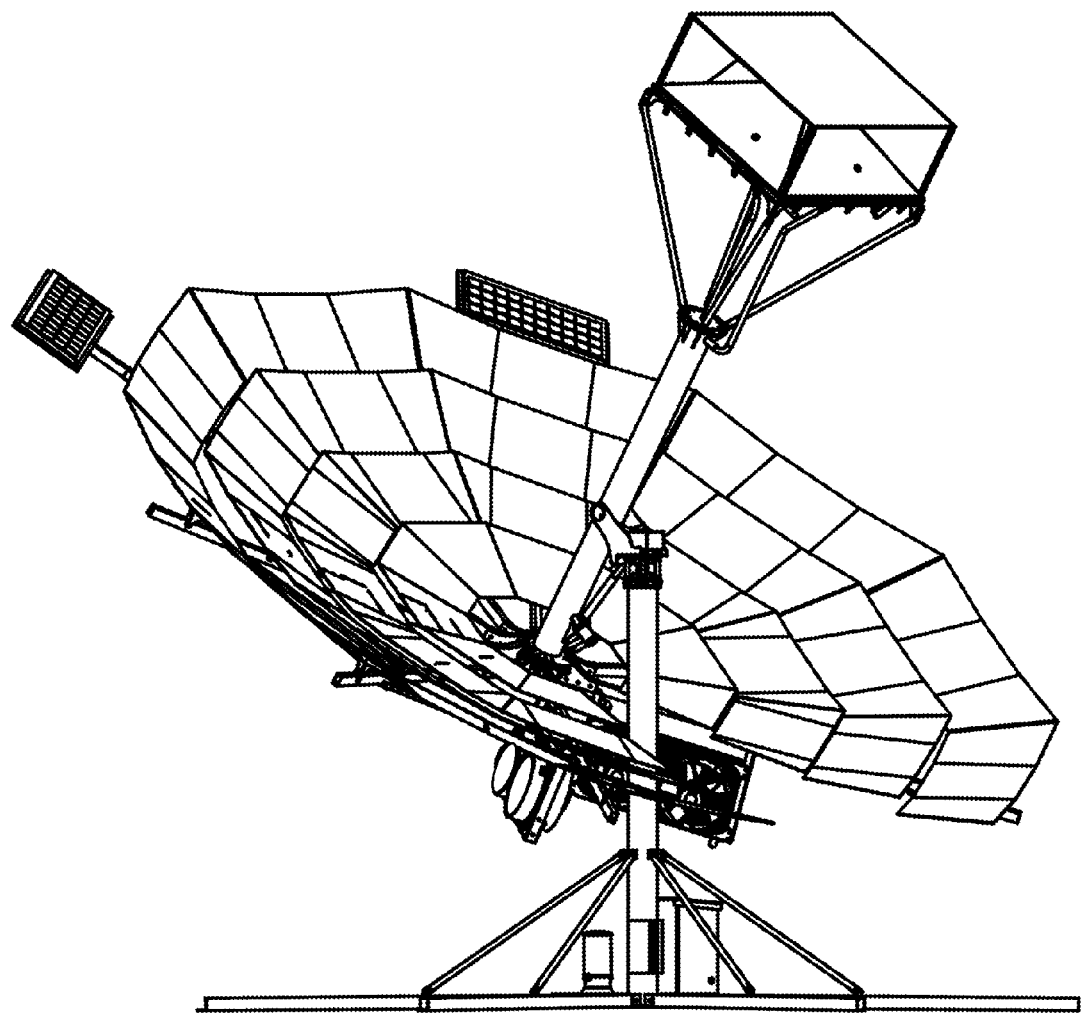
Figure 2C:
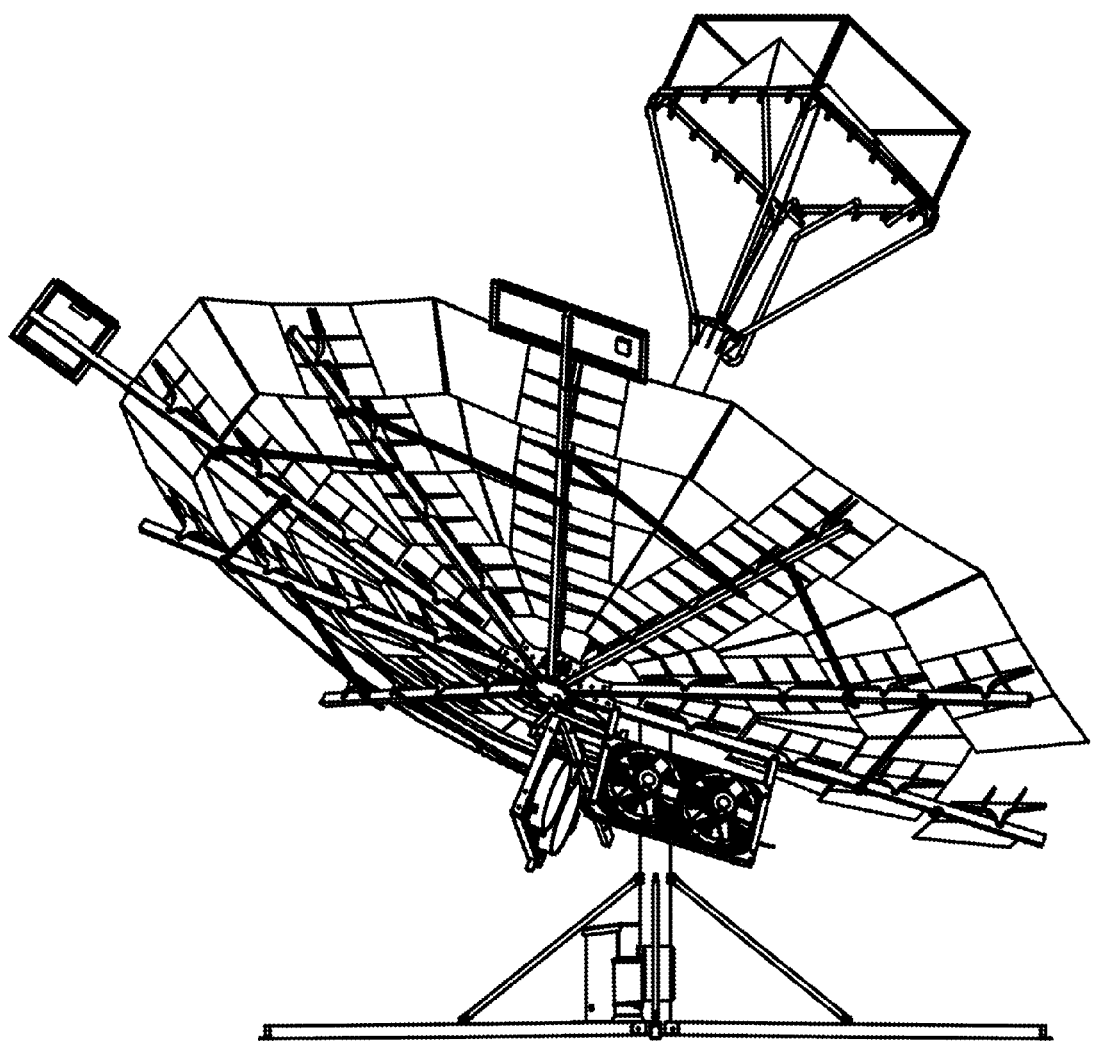
Figure 2D:
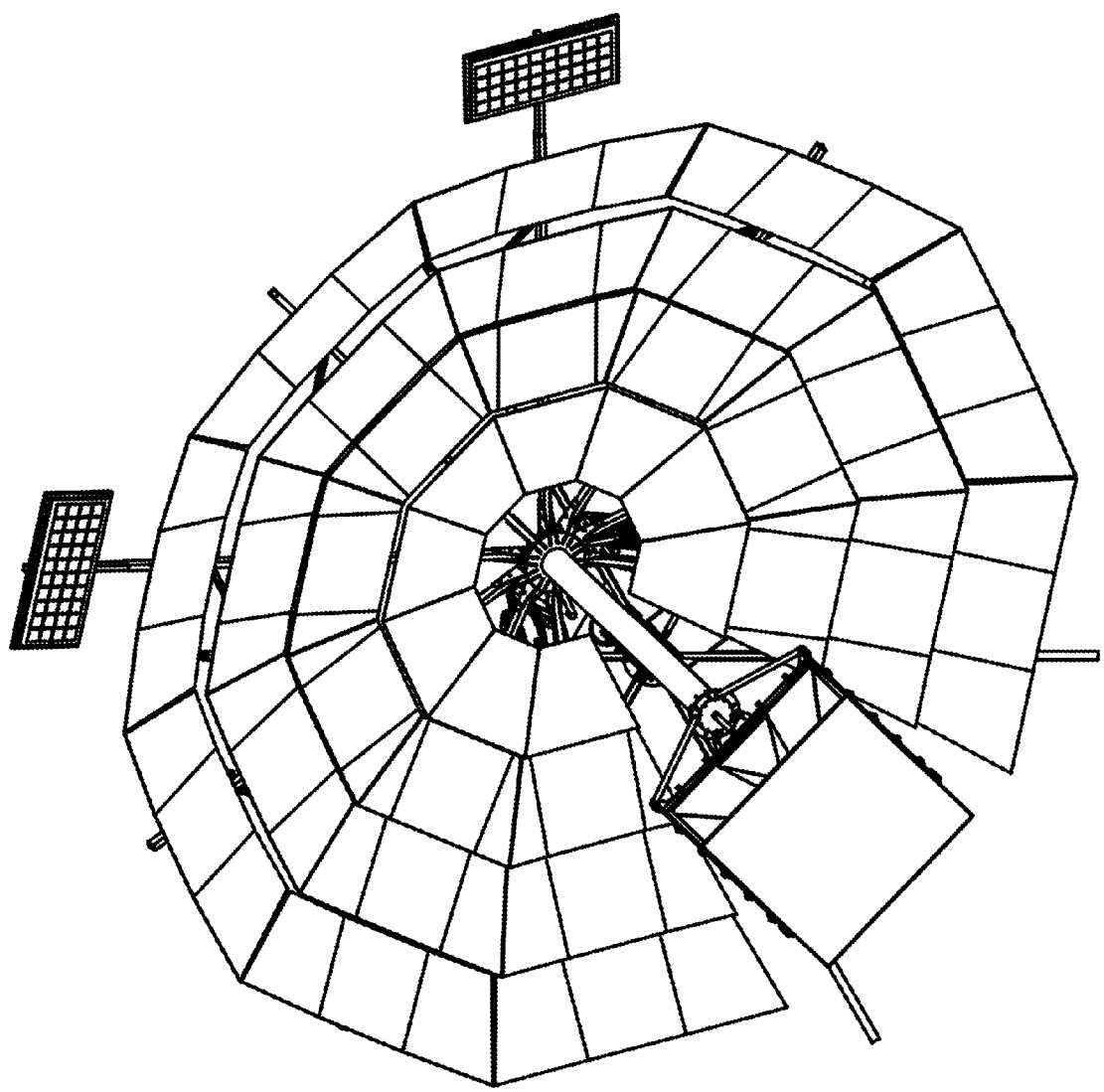

The foregoing summary, as well as the following detailed description of the preferred embodiments of the present invention, will be better understood when read in conjunction with the appended drawings. For the purpose of illustrating the preferred embodiments of the present invention, the drawings depict embodiments that are presently preferred. It should be understood, however, that the present invention is not limited to the arrangements and instrumentality shown in the attached drawings.

DETAILED DESCRIPTION OF THE INVENTION

Solar stills operate on the same principles that produce rainfall, that is—salt water is warmed and evaporated, then cooled to condense back into pure water. Other working liquids, such as sugar solutions in one embodiment, or alcohol in yet another embodiment, may work the same way.

In one embodiment, salt water or contaminated water is pumped from a nearby source and fed into the pyramid shaped boiler. The sun is used to heat the water in order to cause evaporation. This is achieved in another embodiment by an array of mirrors directed at the sun (heliostat) and pointed towards a boiler. The high temperatures produced destroy all pathogens, thus in certain embodiments, decontaminate the water even in the absence of salt. The water in one embodiment evaporates, and in this process, only pure water vapor rises in the shaped boiler, or heat exchanger. The water vapors cause head pressure and flow from the boiler into a counter current heat exchanger (CCHE), where heat is exchanged between the hot vapors leaving the boiler and new cool feed water going back into the boiler. This heat exchange improves the efficiency in another embodiment, since the vapors are cooled to a temperature closer to the condensing point, and the salt water is heated closer to the evaporation point, thereby reducing the temperature differential for each operating stream and its final temperature.

Turning now to FIGS. 1, 5A, 8A and 8B, illustrating an embodiment of the liquid solar still provided herein and showing the solar still system, comprising: a concave heliostat 300; a heliostat stand 500, hingedly connected to a counter-current heat exchanger 400; a shaped heat exchanger 200 having an upper surface 210, a lower surface 201, and side walls therebetween 202, the lower surface 201 configured to allow solar rays redirected from the heliostat to be reflected from a portion of the lower surface 201 (see e.g., FIG. 8A, 8B) hit by the redirected rays from the heliostat 300 to another portion of the lower surface 201'; a counter-current heat exchanger (CCHE) 400 in fluid communication with the shaped heat exchanger 200, the counter current heat exchanger 400 being substantially cylindrical, having a distal end 411 (FIG. 6), operably connected to the heliostat 300 and a proximal end 420, operably connected and in fluid communication with the shaped heat exchanger 200 and configured to provide untreated working liquid to the shaped heat exchanger 200 and collect liquid vapor from the shaped heat exchanger 200; a pump 800, the pump being in fluid communication with the counter current heat exchanger 400; a second heat exchanger 700, in fluid communication with the counter current heat exchanger 400; a solar tracker 600 operably connected between the concave heliostat 300 and the heliostat stand 500, configured to adjust the elevation and direction of the heliostat 300; and a solar energy converter 750 operably connected to the heliostat 300, capable of providing electricity to the pump 800, the second heat exchanger 700, the solar tracker 600 or any combination thereof.

Figure 3A:
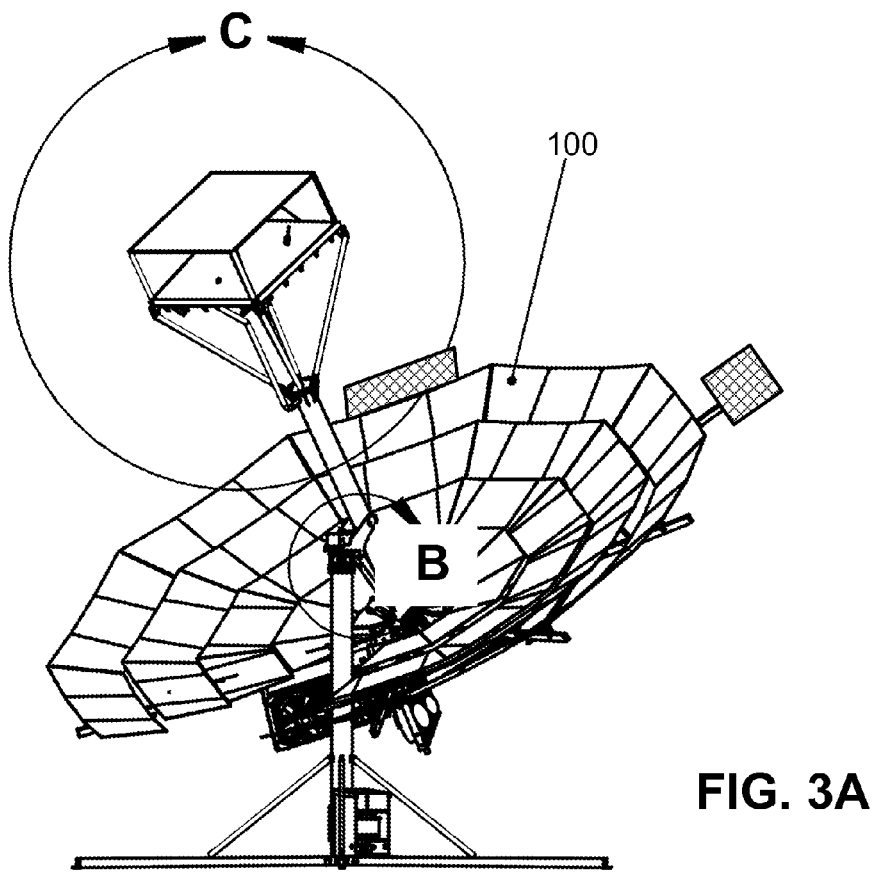
FIG. 3a illustrates the rotational and elevation motion of the system while tracking the sun according to an embodiment of the invention. 3B illustrates an embodiment of the motorized hinged connection between the stand and the heliostat according to embodiments of the present invention and 3C shows a perspective of the shaped heat exchanger according to embodiments of the present invention.
Figure 3B:
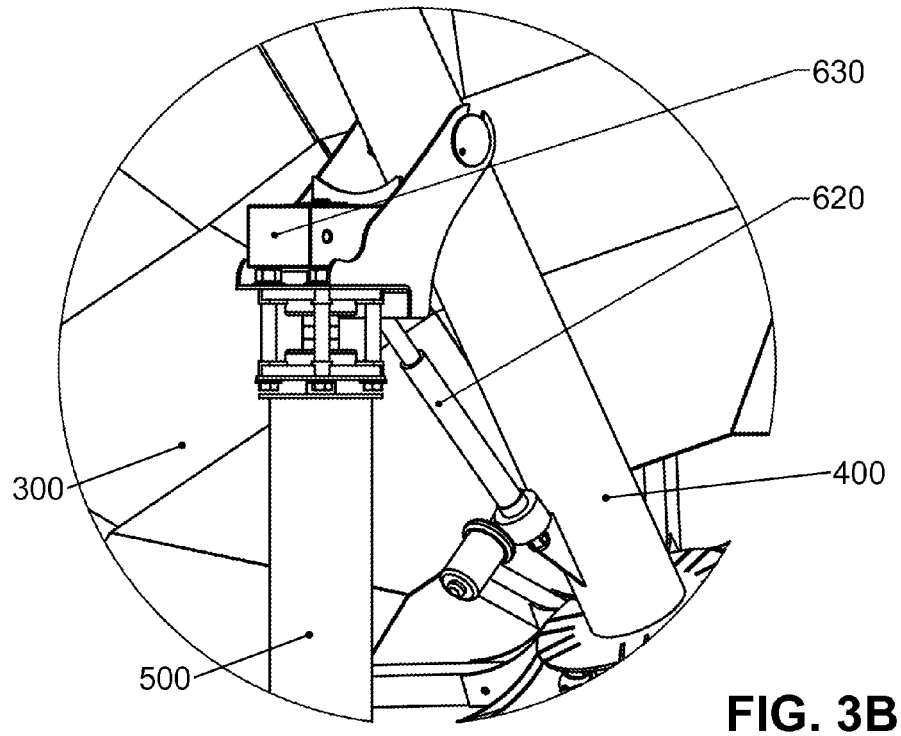

FIG. 3a illustrates the rotational and elevation motion of the system 100 while tracking the sun according to an embodiment of the invention. FIG. 3B shows the heliostat stand 500 in an embodiment of the motorized hinged connection between the stand 500 and the CCHE 400 according to embodiments of the present invention, wherein a motor 630 is attached between the heliostat stand 500 and the hinge connected to the CCHE 400. The motor may rotate 360° and thereby align the heliostat 300, the CCHE 400 and the shaped heat exchanger 200 with the exact azimuth of the sun. Likewise and in another embodiment, an actuating cylinder 620 equipped with telescopic inserts, will be disposed between the hinge and the CCHE 400, configured to allow the heliostat 300, the CCHE 400 and the shaped heat exchanger 200 align with the exact elevation of the sun over the horizon. In certain embodiments, a sun tracker may comprise the rotational motor 630 and the elevation actuator 620 as part of a solar tracking system 600 which further comprise a solar tracking sensor and a central processing unit (CPU) configured to receive a signal from the solar tracking sensor and converting the signal to an output controlling the rotational motor and the elevation actuator at any given time and location.

Figure 3C:
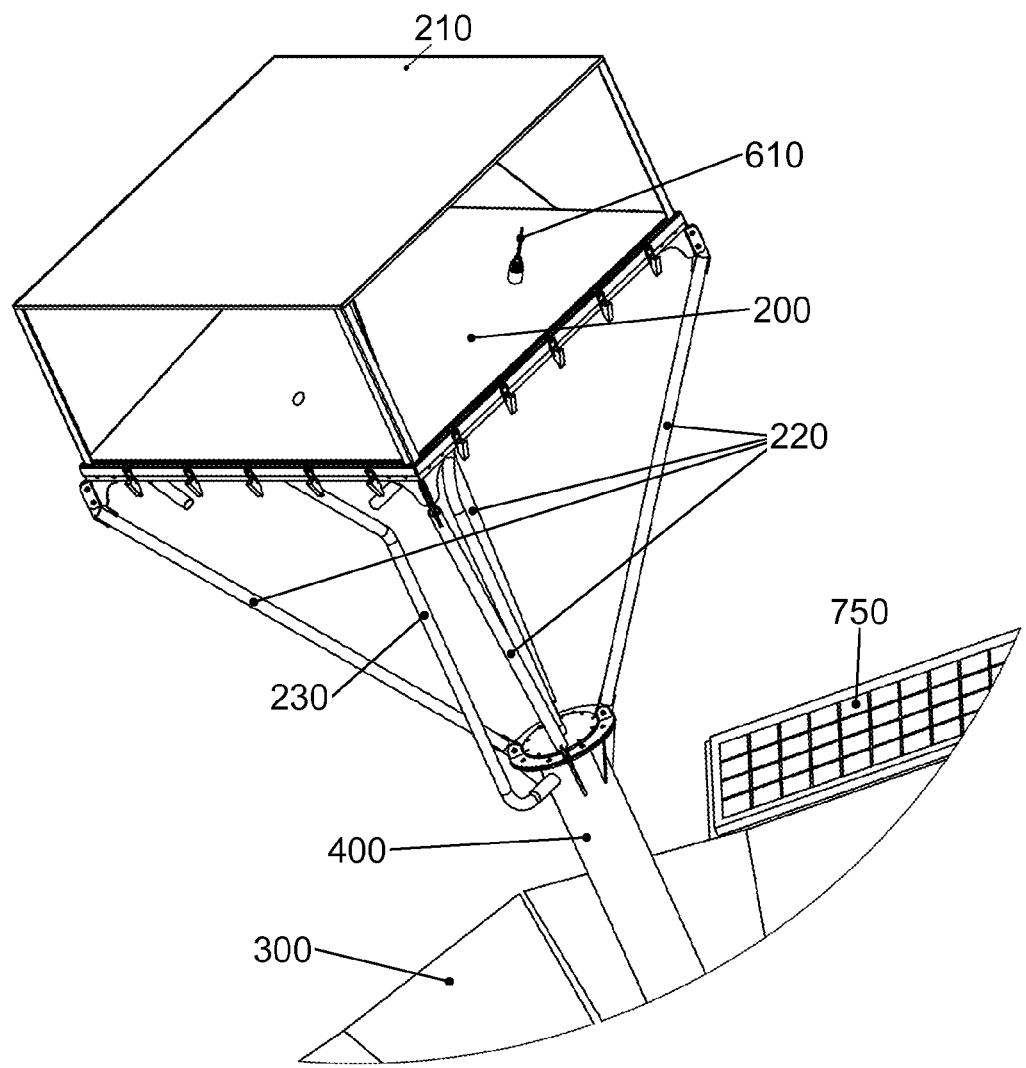

FIG. 3C illustrates an embodiment of a perspective of the shaped heat exchanger 200 according to embodiments of the present invention, wherein the top surface 210, which in certain embodiments be a focusing glass surface or any other suitable material in other embodiments is connected to the bottom surface 201 via the side walls 202, is attached with support rods to the proximal end 420 of the CCHE with a vapor collection pipe in fluid communication with the bottom surface 201 of the shaped heat exchanger 200.

Figure 4:
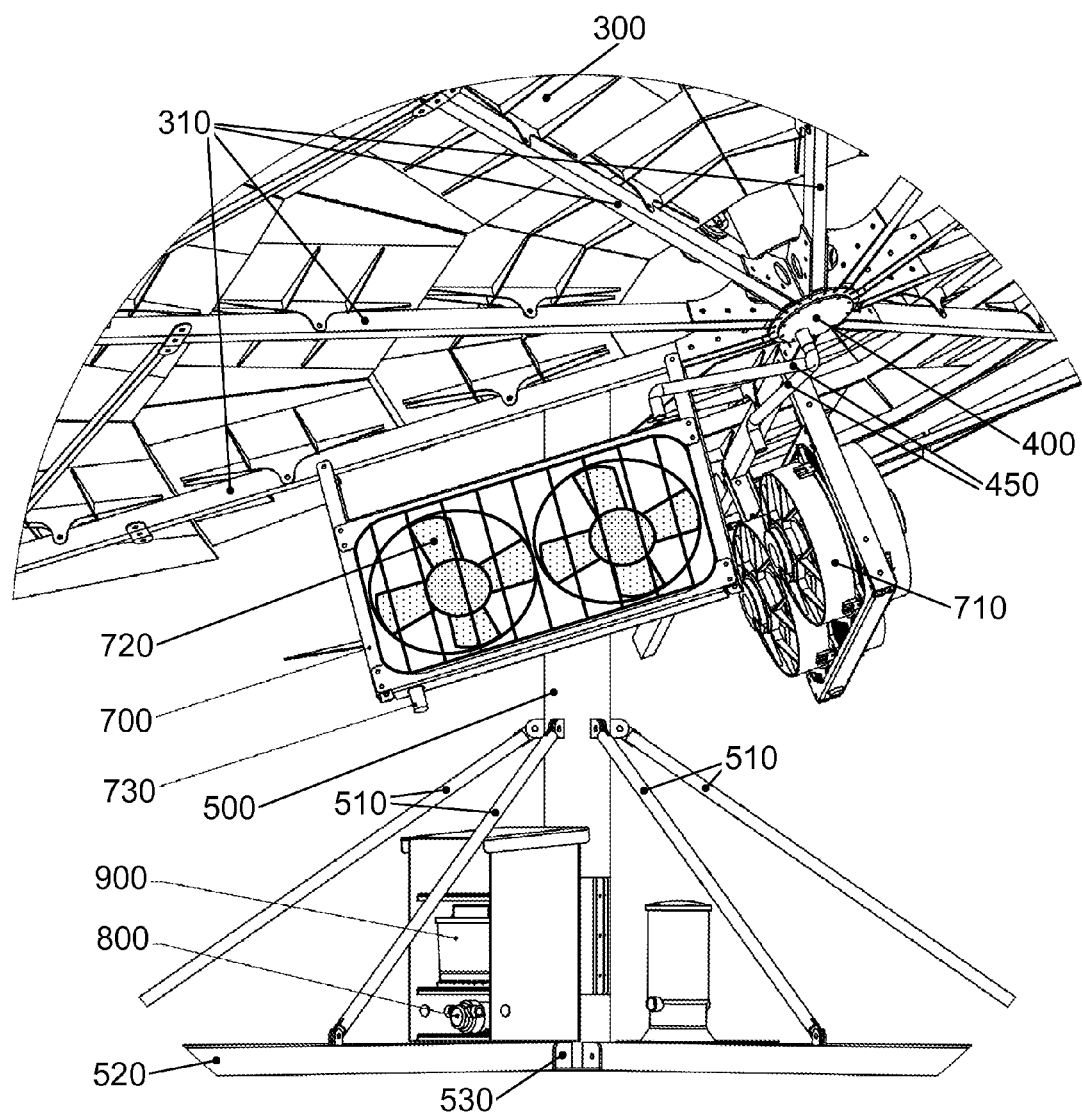
FIG. 4 illustrates a bottom right perspective of the heliostat and second heat exchanger according to embodiments of the present invention.

FIG. 4 shows an illustration of an embodiment of the solar still 100, where the heliostat stand 500 is connected at its distal end to a support plate 520 which is configured to carry a pump 800, a battery 900 and a filter 950. In certain embodiments, the heliostat stand 500 may further comprise support legs 510 configured to fix the heliostat stand to hard surfaces. In certain embodiments, a second heat exchanger 700, such as thin film heat exchanger (TFHE), or a plurality of thin tubes 720 made of an appropriate material having a high heat transfer coefficient in conjunction with cooling fans 710 are used as a condenser, the condenser tubes 720 having ID of between about 1 and 5 mm in one embodiment, or between about 2 and 4 mm in another embodiment, or 3 mm in yet another embodiment, the tubes being in fluid communication making up a total length of about 5 and 50 m in one embodiment, or 10 and 40 m in another embodiment, or between 15 and 25 m in another embodiment, or 20 m in yet another embodiment. In certain embodiments, the cooling fan, which is operably connected to a solar converter 750 is powered by a 10-50 Watts motor in one embodiment, or a 20 Watts motor in another embodiment. In one embodiment, the second heat exchanger 700 is in fluid communication with the distal end's 411 manifold plate 405 through a vapor collection tube 231. The distal end 411 of the CCHE 400 is operably connected to the heliostat assembly 300 support rods 310. In certain embodiments, the condenser 700 may further be in fluid communication with a storage tank.

In certain embodiments, a solar energy converter 750, which may be a photovoltaic cell in another embodiment, powers the components of the solar still 100 requiring electricity. These are in one embodiment the solar sensor, the solar tracker CPU, the rotational motor 630, the elevation actuator 620, the cooling fans 720, the pump 800, the water level sensor 610, charge the battery 900 or any combination thereof.

FIG. 5 illustrates an embodiment of a 4 sided inverted pyramid that is the shape of the lower surface 201 of the shaped heat exchanger 200. FIG. 5a shows support rods 220 connected to a support manifold ring 225, the ring being substantially flat and configured to align with and attach to the proximal end 420 of the CCHE 400 such that the liquid input pipe 232 and vapor collection pipe 231 align with and connect to the appropriate sections in the CCHE 400. Overflow pipes 233 and 234 are also shown. FIG. 6e shows level sensor 610 detecting the level of water in the shaped heat exchanger 200 the sensor configured to control the flow of contaminated or salted liquid from the pump 800, which in some embodiment, may be connected to a contaminated or salted water source. In certain embodiment, the shaped heat exchanger 200 is comprised of a suitable material capable of withstanding the stresses created at the high temperatures experienced during distillation, purification and/or desalination. The material used may also be coated with substances that will increase heat absorption by the body of the heat exchanger with means such as, but not limited to polymeric coatings, paints, metallic coatings and the like.

Turning now to FIG. 6, as shown in FIG. 6c, distal end 410 of the CCHE 400 is equipped with between about 7 and 15 slots in one embodiment, or between 5 and 11 slots in another embodiment, or 9 slots in another embodiment, that are adapted and configured to operably attach to the support rods 310 of the mirrors comprising the heliostat 300 assembly.

Turning now to FIG. 7, showing some of the elements comprising the heliostat 300 assembly in one embodiment support spine 310 is hingedly connected to support rods via adjustable means such as screws, rivets, glue and the like. The reflecting surfaces, used interchangeably with mirrors are of a suitable material, such as polished metal in certain embodiments. These metals may be SS316 in one embodiment, or aluminum in another embodiment. In one embodiment, the term "polished" refers to the percent solar rays reflected off the polished surface being over about 90%. In another embodiment, the element 310 may be adjusted to maximize and or optimize redirection of sun radiation. In another embodiment, heliostat element 310 is comprised of two right angle trapezoids disposed on opposite sides of the longer sides of a rectangle, making an equilateral trapezoid wherein the angle between the three portion of the substantially equilateral trapezoid are adjustable in one embodiment or fixed in another embodiment, and are capable of moving between about 180° and about 87° in relation to the surface of the central rectangle. In certain embodiments, the heliostat assembly 300 will comprise a plurality of heliostat elements 310 of varying sizes and angles.

Figure 8A:
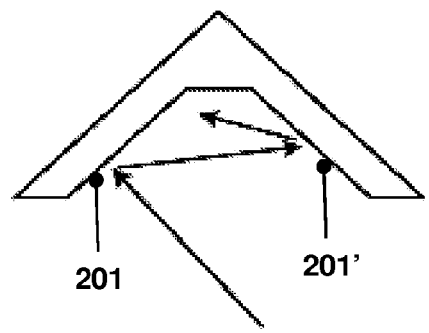
FIG. 8A is a schematic illustrating the redirected rays from the heliostat assembly when the hollow pyramid is positioned according to an embodiment of the invention and when the bottom is blocked and reradiated rays are focused in an aperture in FIG. 8B.
Figure 8B:
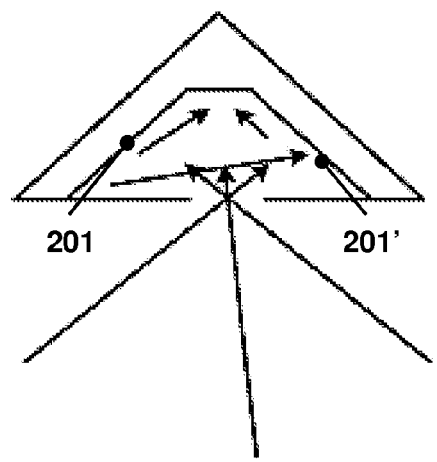

Turning now to FIG. 8b, showing a schematic of an alternative embodiment of the surface of shaped heat exchanger 200, wherein, the lower surface 201 is disposed on top of a substantially flat plate having a reflective top surface, the plate defining an aperture such that solar radiation redirected from the heliostat is focused into the aperture, thereby creating an additional surface to redirect solar radiation locking it in the shaped heat exchanger 200.

In one embodiment, the system provided herein is configured and capable to produce a clean water flow rate of between about 10 and about 15 liters/hour or about 12 and about 13 liters/hour in another embodiment. In another embodiment, the solar still provided herein produces over 5 liter/m$^2$/day.

While the invention has been described with reference to a preferred embodiment, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A working liquid purification system comprising:
   a. a concave heliostat;
   b. a heliostat stand, hingedly connected to a counter-current heat exchanger (CCHE);
   c. an inverted pyramid shaped heat exchanger having 4 or more sides, with an upper surface, a lower surface, and side walls therebetween, the lower 4 or more sided inverted pyramid shaped surface, configured to allow solar rays redirected from the heliostat to be reflected from a side of the lower surface hit by the redirected rays to another side of the lower surface;
   d. the counter-current heat exchanger (CCHE), in fluid communication with the inverted pyramid shaped heat exchanger, the counter current heat exchanger being substantially cylindrical, having a distal end operably connected to the heliostat and a proximal end in fluid communication with the shaped heat exchanger and configured to provide untreated working liquid to the shaped heat exchanger and collect liquid vapor from the shaped heat exchanger;
   e. a pump, the pump being in fluid communication with the counter current heat exchanger and a source of the working fluid;
   f. a second heat exchanger, in liquid communication with the counter current heat exchanger (CCHE) and a storage tank;
   g. a solar tracker operably connected between the concave heliostat and the heliostat stand, configured to adjust the elevation and direction of the heliostat; and
   h. a solar energy converter operably connected to the heliostat, capable of providing electricity to the pump, the second heat exchanger, the solar tracker or any combination thereof.

2. The system of claim 1, wherein the solar tracker comprises:
   a. a solar tracking sensor;
   b. a rotational motor;
   c. an elevation actuator; and
   d. a central processing unit capable of receiving a signal from the solar tracking sensor and converting the signal to an output controlling the rotational motor and the elevation actuator.

3. The system of claim 1, wherein the working liquid is water.

4. The system of claim 1, wherein the heliostat comprises an array of reflecting surfaces operably connected to support rods.

5. The system of claim 4, wherein the array of reflecting surfaces are comprised of polished metal.

6. The system of claim 5, wherein the polished metal is aluminum.

7. The system of claim 1, wherein the second heat exchanger is a condenser.

8. The system of any one of claim 1, wherein the solar energy converter is a photovoltaic cell.

9. The system of any one of claim 1, wherein the heliostat stand further comprises at least 2 extensions configured to enable attaching the stand to a hard surface.

10. The system of any one of claim 2, wherein the solar tracker is configured to align the axis of the counter-current cylindrical heat exchanger with the angle and direction of the sun in relation to a point on the horizon.

11. The system of any one of claim 1, wherein the solar energy converter is operably connected to a battery.

12. The system of claim 11, wherein the battery powers the pump, the second heat exchanger, the solar tracker or any combination thereof.

13. The system of claim 1, wherein the treated liquid is collected at an amount of at least 10 liters/hr.

14. The system of claim 1, wherein the working fluid is a sugar solution or alcohol.

15. The system of claim 1, wherein, the lower 4 or more sided inverted pyramid shaped surface is disposed on top of a substantially flat plate having a reflective top surface, the plate defining an aperture.

16. A method of purifying a working liquid, comprising the steps of:
   a. providing the system of claim 1;
   b. while tracking the sun, using the pump, pumping the working liquid from the source to the counter current heat exchanger; and
   c. collecting the purified liquid in the storage tank.

* * * * *